United States Patent
Du et al.

(10) Patent No.: US 9,355,785 B2
(45) Date of Patent: May 31, 2016

(54) ELECTROLYTE MIXTURE, ELECTROLYTIC CAPACITOR HAVING THE SAME AND OXIDANT MIXTURE FOR CONJUGATED POLYMER SYNTHESIS

(71) Applicant: Industrial Technology Research Institute, Hsinchu (TW)

(72) Inventors: Yi-Chang Du, Taoyuan County (TW); Li-Duan Tsai, Hsinchu (TW); Hung-Chung Chien, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 157 days.

(21) Appl. No.: 13/951,470

(22) Filed: Jul. 26, 2013

(65) Prior Publication Data

US 2014/0027663 A1    Jan. 30, 2014

(30) Foreign Application Priority Data

Jul. 26, 2012  (TW) .............................. 101127060 A

(51) Int. Cl.
  *H01G 9/028* (2006.01)
  *H01G 9/15* (2006.01)

(52) U.S. Cl.
  CPC . *H01G 9/028* (2013.01); *H01G 9/15* (2013.01)

(58) Field of Classification Search
  CPC .................................................... H01G 9/028
  See application file for complete search history.

(56) References Cited

U.S. PATENT DOCUMENTS

| | | | |
|---|---|---|---|
| 6,421,228 B2 * | 7/2002 | Araki | H01G 9/0036 361/523 |
| 7,208,104 B2 | 4/2007 | Tsai et al. | |
| 7,811,338 B2 | 10/2010 | Naito et al. | |
| 7,938,866 B2 * | 5/2011 | Biler | 29/25.03 |
| 2009/0021894 A1 * | 1/2009 | Ning et al. | 361/527 |
| 2009/0068531 A1 | 3/2009 | Sawa et al. | |
| 2009/0128887 A1 | 5/2009 | Sugimoto et al. | |
| 2010/0165546 A1 * | 7/2010 | Yoshida | H01G 9/0036 361/525 |
| 2011/0182002 A1 | 7/2011 | Takahashi et al. | |

FOREIGN PATENT DOCUMENTS

| | | | |
|---|---|---|---|
| CN | 101379138 | | 3/2009 |
| CN | 101486838 | * | 7/2009 |
| TW | 201127918 | * | 8/2011 |

OTHER PUBLICATIONS

Translation for CN 101486838, Jul. 22, 2009.*
Jin-Yeol Kim, et al., "Self-Assembly and Crystalline Growth of Poly(3,4-ethylenedioxythiophene)Nanofilms", Advanced Material, vol. 19, Issue 21, Nov. 2007, pp. 3501-3506.

(Continued)

*Primary Examiner* — Carol M Koslow
(74) *Attorney, Agent, or Firm* — Jianq Chyun IP Office

(57) ABSTRACT

An electrolyte mixture for an electrolytic capacitor is provided. The electrolyte mixture includes a conjugated polymer, a polyether and a nitrogen-containing compound, or includes the conjugated polymer, the polyether and a nitrogen-containing polymer, or includes the conjugated polymer and a polyether with nitrogen-containing functional groups. The electrolyte mixture provides a very high static capacitance for an electrolytic capacitor having the same.

9 Claims, 1 Drawing Sheet

(56) References Cited

OTHER PUBLICATIONS

Bjørn Winther-Jensen, et al., "Inhomogeneity Effects in Vapor Phase Polymerized PEDOT: A Tool to Influence Conductivity", Macromolecular Materials and Engineering, vol. 296, Issue 2, Feb. 14, 2011, pp. 185-189.

Jen-Hsien Huang, et al., "Achieving efficient poly(3,4-ethylenedioxythiophene)—based supercapacitors by controlling the polymerization kinetics", Electrochimica Acta, vol. 56, Issue 20, Aug. 1, 2011, pp. 7228-7234.

Tiejun Wang, et al., "Effects of poly(ethylene glycol) on electrical conductivity of poly(3,4-ethylenedioxythiophene)-poly(styrenesulfonic acid) film", Applied Surface Science, vol. 250, Issues 1-4, Aug. 31, 2005, pp. 188-194.

Kamil Zuber, et al., "Improved PEDOT Conductivity via Suppression of Crystallite Formation in Fe(III) Tosylate During Vapor Phase Polymerization", Macromolecular Rapid Communications, vol. 29, Issue 18, Sep. 17, 2008, pp. 1503-1508.

"Office Action of China Counterpart Application", issued on Oct. 30, 2015, pp. 1-7, in which the listed references were cited.

* cited by examiner

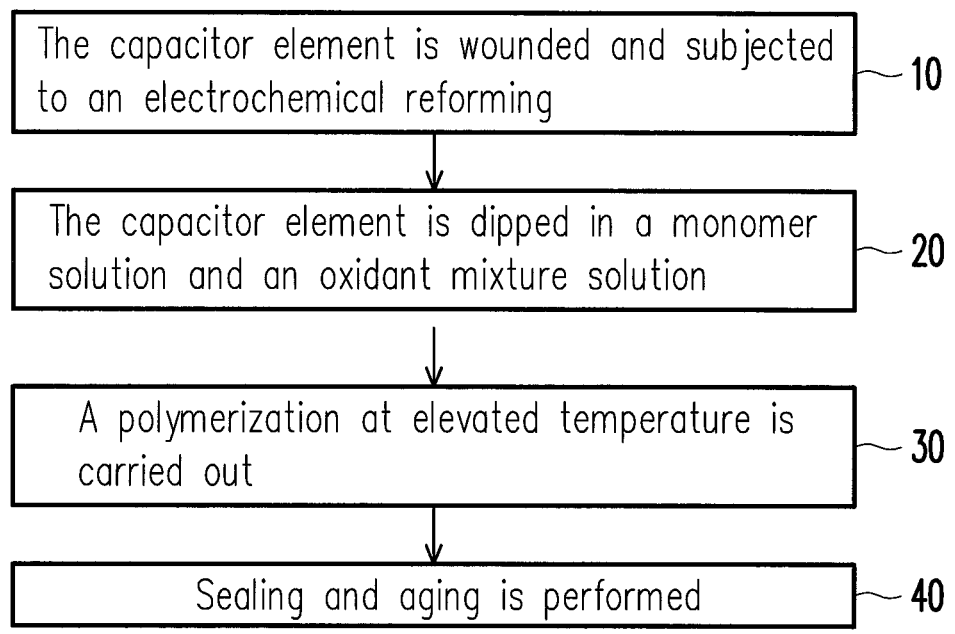

ELECTROLYTE MIXTURE, ELECTROLYTIC CAPACITOR HAVING THE SAME AND OXIDANT MIXTURE FOR CONJUGATED POLYMER SYNTHESIS

CROSS-REFERENCE TO RELATED APPLICATION

This application claims the priority benefit of Taiwan application serial no. 101127060, filed on Jul. 26, 2012. The entirety of the above-mentioned patent application is hereby incorporated by reference herein and made a part of this specification.

BACKGROUND

1. Technical Field

The technical field relates to an electrolyte mixture, an electrolytic capacitor having the same and an oxidant mixture for conjugated polymer synthesis.

2. Background

Improving the electrolyte conductivity has long been one of the major topics in the development of an electrolytic capacitor. The electrolyte with a high conductivity can reduce the equivalent series resistance (ESR) of the electrolytic capacitor, so as to provide high-frequency low impedance and high reliability. A conductive polymer has a higher conductivity than an aqueous electrolyte or a solid organic semiconductor complex salt (e.g. tetracyanoquinodimethane (TCNQ) complex salt) used for conventional capacitors, and exhibits an adequate insulating property at high temperature. Therefore, such conductive polymer has become the mainstream of the solid electrolyte for existing electrolytic capacitors.

As compared to the conventional aqueous electrolyte, the conductive polymer as an electrolyte of an electrolytic capacitor provides low impedance and good thermal stability. However, the static capacitance of the electrolytic capacitor having the conductive polymer as an electrolyte is usually lower than that of the conventional aqueous electrolytic capacitor with similar size. The lower static capacitance has become the main drawback of the solid electrolytic capacitor.

SUMMARY

One of exemplary embodiments includes an electrolyte mixture for an electrolytic capacitor, and the electrolyte mixture at least includes a conjugated polymer, a polyether and a nitrogen-containing compound, or at least consists of the conjugated polymer, the polyether and a nitrogen-containing polymer, or at least includes the conjugated polymer and a polyether with nitrogen-containing functional groups.

One of exemplary embodiments at least includes an oxidant mixture for conjugated polymer synthesis, and the oxidant mixture at least includes an oxidant, a polyether and a nitrogen-containing compound, or at least include the oxidant, the polyether and a nitrogen-containing polymer, or at least include the oxidant and a polyether compound with nitrogen-containing functional groups.

One of exemplary embodiments includes a solid electrolytic capacitor including a conductive polymer mixture as a solid electrolyte, and precursors of the conductive polymer mixture at least includes a monomer of a conjugated polymer, an oxidant, a polyether and a nitrogen-containing compound, or at least includes the monomer of the conjugated polymer, the oxidant, the polyether and a nitrogen-containing polymer, or at least includes the monomer of the conjugated polymer, the oxidant and a polyether with nitrogen-containing functional groups, wherein the precursors are mixed, and the monomer of the conjugated polymer is reacted with the oxidant in a condition, so as to form the conjugated polymer.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1 is a process flow of a method of fabricating a solid electrolytic capacitor according to an exemplary embodiment.

DETAILED DESCRIPTION OF DISCLOSED EMBODIMENTS

One of exemplary embodiments provides a solid electrolytic capacitor, such as a solid electrolytic capacitor having a conductive polymer as an electrolyte, in which a conductive polymer mixture as a solid electrolyte is polymerized from a monomer of a conjugated polymer and an oxidant mixture.

The monomer of the conjugated polymer includes thiophene, a thiophene derivative, pyrrole, a pyrrole derivative, aniline, an aniline derivative, or a combination thereof. In an embodiment, the monomer of the conjugated polymer includes 3,4-ethylenedioxythiophene.

The oxidant mixture at least includes an oxidant, a polyether, and a nitrogen-containing compound or a nitrogen-containing polymer, or at least includes the oxidant and a polyether with nitrogen-containing functional groups.

The oxidant includes a ferric ion-containing salt, a copper ion-containing salt, or a persulfate. The ferric ion-containing salt includes ferric sulfate, ferric p-toluenesulfonate, ferric chloride, ferric nitrate, ferric perchlorate, or a combination thereof. The persulfate includes sodium persulfate, ammonium persulfate, or a combination thereof.

The polyether at least has a repeating unit structure represented by the following formula:

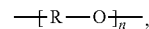

wherein R is a linear or branched aliphatic structure, or a liner or branched aromatic structure; and n is from 1 to 1000.

The polyether includes polyethylene glycol (PEG), a polyethylene glycol copolymer, polyethylene oxide (PEO), a polyethylene oxide copolymer, polypropylene glycol (PPG), a polypropylene glycol copolymer, polyoxymethylene, a polyoxymethylene copolymer, polyphenylene oxide, a polyphenylene oxide copolymer, or a combination thereof.

The nitrogen-containing compound includes an imidazole compound, an imidazole derivative, an imidazoline compound, an imidazoline derivative, an urea compound, an urea derivative, an urethane compound, an urethane derivative, an imide compound, an imide derivative, an amide compound, an amide derivative, a pyridine compound, a pyridine derivative, a malamine compound, a malamine derivative, a triazole compound, a triazole derivative, or a combination thereof.

The nitrogen-containing polymer includes polyacrylamide, polyvinyl pyrrolidone, polyvinyl pyridine, polyethyleneimine, polyamide, polyimide, a secondary amine-containing polymer, a tertiary amine-containing polymer, a quaternary amine-containing polymer, or a combination thereof.

The amount ratio of components of the electrolyte mixture is not limited herein. In an embodiment, in order to provide better electrolyte properties, the monomer of the conductive polymer and the oxidant are in a molar ratio of 2.5:1 to 1:2.5.

The amount ratio of components of the oxidant mixture, the molecular weight of the polyether, and the molecular weight of the nitrogen-containing polymer are not limited herein. In an embodiment, in order to provide an adequate liquid viscosity for the following reaction and fabrication of the capacitor, the amount of the polyether is not higher than 50 wt % of the oxidant mixture, the amount of an oxidant in the oxidant mixture is not higher than 70 wt % of the oxidant mixture. Besides, the nitrogen-containing compound or the repeating units of the nitrogen-containing polymer or nitrogen-containing functional groups of the nitrogen-containing polyether to the oxidant are in a molar ratio of no more than 2.

The conductive polymer mixture as a solid electrolyte polymerized from the monomer of the conjugated polymer and the oxidant mixture at least includes a conjugated polymer, a polyether and a nitrogen-containing compound, or at least includes the conjugated polymer, the polyether and a nitrogen containing polymer, or at least includes the conjugated polymer and a polyether with nitrogen-containing functional groups.

In the conductive polymer mixture as a solid electrolyte, the conjugated polymer includes polythiophene, a polythiophene derivative, polypyrrole, a polypyrrole derivative, polyaniline, a polyaniline derivative, or a combination thereof.

In the conductive polymer mixture as a solid electrolyte, the polyether and the nitrogen-containing compound are the same as those described above.

In an embodiment, the conductive polymer mixture as a solid electrolyte includes 10 wt % to 50 wt % of the conjugated polymer, 7 wt % to 40 wt % of the polyether, and 1.5 wt % to 10 wt % of the nitrogen-containing compound. In another embodiment, the conductive polymer mixture as a solid electrolyte includes 10 wt % to 50 wt % of the conjugated polymer, 7 wt % to 40 wt % of the polyether, and 1.5 wt % to 10 wt % of the nitrogen-containing polymer.

Other compounds can be added to the formulation and composition of the electrolyte mixture herein, so as to adjust properties to meet various requirements. For example, p-toluenesulfonic acid as a doping agent can be added to provide better conductive properties for the solid conductive mixture, or tetrahydrofuran (THF) can be added to improve processing or reaction properties.

As for the formulation and composition of the electrolyte mixture herein, the mixing sequence of components can be adjusted upon the actual requirement. For example, the polyether and the nitrogen-containing compound can be mixed with the monomer, and the oxidant is then added thereto to initiate the polymerization reaction.

FIG. 1 is a process flow of a method of fabricating a solid electrolytic capacitor according to an exemplary embodiment.

Referring to FIG. 1, in an embodiment, a method of fabricating a solid electrolytic capacitor includes implementing a step 10, in which an anode aluminium foil with an $Al_2O_3$ dielectric layer and a cathode aluminium foil are wound together with an interposed separator, so as to fabricate a solid electrolytic capacitor element. The solid electrolytic capacitor element is subjected to an electrochemical reforming, in which the surface of the metal electrode is oxidized by an electrochemical electrolysis reaction to form a metal oxide dielectric layer on the anode.

Thereafter, a step 20 is implemented to dip the solid electrolytic capacitor element in the monomer solution of the conjugated polymer and the oxidant mixture solution.

Afterwards, a step 30 is implemented to carry out a polymerization at elevated temperature, in which a polymerization reaction is accelerated with increasing temperature, so as to form a conductive polymer on the surface of the dielectric layer. The conductive polymer serves as an electrolyte mixture of the solid electrolytic capacitor. The elevated temperature up to 170° C. maximum is provided to ensure a complete polymerization.

Then, a step 40 is implemented to perform sealing and aging, in which the solid electrolytic capacitor element is encased in a case, sealed and aged. The case is an aluminium case, for example. The solid electrolytic capacitor element is sealed with rubber. The solid electrolytic capacitor is thus completed.

The solid electrolytic capacitor herein can be fabricated with other known methods and the fabricating method thereof is not limited by the said embodiment.

The oxidant mixture for conjugated polymer synthesis herein can affectively and synergistically increase the static capacitance of the fabricated solid electrolytic capacitor.

Example 1

An anode aluminium foil having an $Al_2O_3$ dielectric layer formed through an electrochemical reaction at 41V and a cathode aluminium foil having a high surface area caused by electrochemical corrosion were wounded together with an interposed separator, so as to form a solid electrolytic capacitor element. Then, the capacitor element was put in an organic acid solution for an electrochemical reforming of the damaged $Al_2O_3$ dielectric layer. The reforming capacitor element was dipped in a monomer solution of 3,4-ethylenedioxythiophene (EDOT) and an oxidant solution listed in Table 1, respectively. A polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 16 V to lower the leakage current of the capacitor. A solid electrolytic capacitor of Example 1 was thus completely fabricated. The properties such as static capacitance, 100 kHz equivalent series resistance (ESR), leakage current (LC) of each solid electrolytic capacitor of Example 1 were measured and listed in Table 1.

TABLE 1

| | Composition of oxidant solution (wt %) | | | | Solid electrolytic capacitor properties | | | |
| --- | --- | --- | --- | --- | --- | --- | --- | --- |
| # | ferric p-toluene-sulfonate | polyethylene glycol* | imidazole | methanol | | Capacitance (μF) | 100 kHz ESR (mΩ) | LC (μA) |
| 1 | 50 | — | — | 50 | Average | 180.14 | 10.59 | 9.57 |
| | | | | | Std. | 1.77 | 0.55 | 4.30 |
| 2 | 50 | 10 | — | 40 | Average | 210.03 | 9.51 | 6.78 |
| | | | | | Std. | 2.21 | 0.38 | 5.45 |

TABLE 1-continued

| | Composition of oxidant solution (wt %) | | | | Solid electrolytic capacitor properties | | | |
|---|---|---|---|---|---|---|---|---|
| # | ferric p-toluene-sulfonate | polyethylene glycol* | imidazole | methanol | Capacitance (μF) | | 100 kHz ESR (mΩ) | LC (μA) |
| 3 | 50 | — | 2.99 | 47.01 | Average | 168.15 | 10.52 | 5.13 |
| | | | | | Std. | 2.67 | 0.30 | 2.82 |
| 4 | 50 | 10 | 2.99 | 37.01 | Average | 246.08 | 9.61 | 2.92 |
| | | | | | Std. | 2.86 | 0.40 | 1.22 |

*The molecular weight of polyethylene glycol is 1000.

The effect of polyethylene glycol and imidazole to the solid electrolytic capacitor is shown in the solid electrolytic capacitor properties listed in Table 1. It is found that the static capacitance of the solid electrolytic capacitor is increased from 180 μF to 210 μF by addition of polyethylene glycol to the oxidant solution. It is also found that the static capacitance is slightly reduced to 168 μF by addition of only imidazole to the oxidant solution; that is, imidazole alone in the oxidant solution does not improve the static capacitance of the solid electrolytic capacitor. However, when both polyethylene glycol and imidazole are present in the oxidant solution, the static capacitance of the solid electrolytic capacitor is increased up to 246 μF; that is, the co-existence of polyethylene glycol and imidazole has a synergistic effect on improvement of the static capacitance of the solid electrolytic capacitor. The results show that the co-existence of polyethylene glycol and imidazole can achieve an unexpected effect, and therefore the static capacitance of the solid electrolytic capacitor can be affectively and synergistically enhanced.

Example 2

A solid electrolytic capacitor element fabricated according to the manner of Example 1 was dipped in a monomer solution of 3,4-ethylenedioxythiophene (EDOT) and an oxidant solution listed in Table 2, followed by polymerization, sealing and charge aging with reference to the conditions of Example 1, so as to form a solid electrolytic capacitor of Example 2. The properties such as static capacitance, 100 kHz equivalent series resistance (ESR), leakage current (LC) of each solid electrolytic capacitor of Example 2 were measured and listed in Table 2.

The effect of polyethylene glycol and 2-methyl imidazole to the solid electrolytic capacitor is shown in the solid electrolytic capacitor properties listed in Table 2. It is found that the static capacitance of the solid electrolytic capacitor is increased from 180 μF to 210 μF by addition of polyethylene glycol to the oxidant solution. It is also found that the static capacitance is maintained at 181 μF by addition of only 2-methyl imidazole to the oxidant solution; that is, 2-methyl imidazole alone in the oxidant solution does not improve the static capacitance of the solid electrolytic capacitor. However, when both polyethylene glycol and 2-methyl imidazole are present in the oxidant solution, the static capacitance of the solid electrolytic capacitor is increased up to 250 μF; that is, the co-existence of polyethylene glycol and 2-methyl imidazole has a synergistic effect on improvement of the static capacitance of the solid electrolytic capacitor. The results show that the co-existence of polyethylene glycol and 2-methyl imidazole can achieve an unexpected effect, and therefore the static capacitance of the solid electrolytic capacitor can be affectively enhanced.

Example 3

A solid electrolytic capacitor element fabricated according to the manner of Example 1 was dipped in a monomer solution of 3,4-ethylenedioxythiophene (EDOT) and an oxidant solution listed in Table 3, followed by polymerization, sealing and charge aging with reference to the conditions of Example 1, so as to form a solid electrolytic capacitor of Example 3. The properties such as static capacitance, 100 kHz equivalent series resistance (ESR), leakage current (LC) of each solid electrolytic capacitor of Example 3 were measured and listed in Table 3.

TABLE 2

| | Composition of oxidant solution (wt %) | | | | Solid electrolytic capacitor properties | | | |
|---|---|---|---|---|---|---|---|---|
| # | ferric p-toluene-sulfonate | polyethylene glycol* | 2-methyl imidazole | methanol | Capacitance (μF) | | 100 kHz ESR (mΩ) | LC (μA) |
| 1 | 50 | — | — | 50 | Average | 180.14 | 10.59 | 9.57 |
| | | | | | Std. | 1.77 | 0.55 | 4.30 |
| 2 | 50 | 10 | — | 40 | Average | 210.03 | 9.51 | 6.78 |
| | | | | | Std. | 2.21 | 0.38 | 5.45 |
| 3 | 50 | — | 3.60 | 46.4 | Average | 181.07 | 11.71 | 3.21 |
| | | | | | Std. | 3.17 | 0.69 | 1.88 |
| 4 | 50 | 10 | 3.60 | 36.4 | Average | 250.14 | 9.44 | 4.03 |
| | | | | | Std. | 2.93 | 0.29 | 2.68 |

*The molecular weight of polyethylene glycol is 1000.

TABLE 3

| # | ferric p-toluene-sulfonate | polyethylene glycol* | urea | methanol | Capacitance ($\mu$F) | | 100 kHz ESR (m$\Omega$) | LC ($\mu$A) |
|---|---|---|---|---|---|---|---|---|
| 1 | 50 | — | — | 50 | Average | 180.14 | 10.59 | 9.57 |
|   |    |   |   |    | Std. | 1.77 | 0.55 | 4.30 |
| 2 | 50 | 10 | — | 40 | Average | 210.03 | 9.51 | 6.78 |
|   |    |    |   |    | Std. | 2.21 | 0.38 | 5.45 |
| 3 | 50 | — | 2.64 | 47.56 | Average | 164.22 | 10.91 | 17.65 |
|   |    |   |      |       | Std. | 2.63 | 0.31 | 14.84 |
| 4 | 50 | 10 | 2.64 | 37.56 | Average | 223.04 | 9.87 | 3.87 |
|   |    |    |      |       | Std. | 2.05 | 0.38 | 2.75 |

*The molecular weight of polyethylene glycol is 1000.

The effect of polyethylene glycol and urea to the solid electrolytic capacitor is shown in the solid electrolytic capacitor properties listed in Table 3. It is found that the static capacitance of the solid electrolytic capacitor is increased from 180 $\mu$F to 210 $\mu$F by addition of polyethylene glycol to the oxidant solution. It is also found that the static capacitance is slightly reduced to 164 $\mu$F by addition of only urea to the oxidant solution; that is, urea alone in the oxidant solution does not improve the static capacitance of the solid electrolytic capacitor. However, when both polyethylene glycol and urea are present in the oxidant solution, the static capacitance of the solid electrolytic capacitor is increased up to 223 $\mu$F; that is, the co-existence of polyethylene glycol and urea has a synergistic effect on improvement of the static capacitance of the solid electrolytic capacitor. The results show that the co-existence of polyethylene glycol and urea can achieve an unexpected effect, and therefore the static capacitance of the solid electrolytic capacitor can be affectively enhanced.

The effect of polyethylene glycol and urethane to the solid electrolytic capacitor is shown in the solid electrolytic capacitor properties listed in Table 4. It is found that the static capacitance of the solid electrolytic capacitor is increased from 180 $\mu$F to 210 $\mu$F by addition of polyethylene glycol to the oxidant solution. It is also found that the static capacitance is slightly reduced to 176 $\mu$F by addition of only urethane to the oxidant solution; that is, urethane alone in the oxidant solution does not improve the static capacitance of the solid electrolytic capacitor. However, when both polyethylene glycol and urethane are present in the oxidant solution, the static capacitance of the solid electrolytic capacitor is increased up to 230 $\mu$F; that is, the co-existence of polyethylene glycol and urethane has a synergistic effect on improvement of the static capacitance of the solid electrolytic capacitor. The results show that the co-existence of polyethylene glycol and urethane can achieve an unexpected effect, and therefore the static capacitance of the solid electrolytic capacitor can be affectively enhanced.

Example 4

A solid electrolytic capacitor element fabricated according to the manner of Example 1 was dipped in a monomer solution of 3,4-ethylenedioxythiophene (EDOT) and an oxidant solution listed in Table 4, followed by polymerization, sealing and charge aging with reference to the conditions of Example 1, so as to form a solid electrolytic capacitor of Example 4. The properties such as static capacitance, 100 kHz equivalent series resistance (ESR), leakage current (LC) of each solid electrolytic capacitor of Example 4 were measured and listed in Table 4.

Example 5

A solid electrolytic capacitor element fabricated according to the manner of Example 1 was dipped in a monomer solution of 3,4-ethylenedioxythiophene (EDOT) and an oxidant solution listed in Table 5, followed by polymerization, sealing and charge aging with reference to the conditions of Example 1, so as to form a solid electrolytic capacitor of Example 5. The properties such as static capacitance, 100 kHz equivalent series resistance (ESR), leakage current (LC) of each solid electrolytic capacitor of Example 5 were measured and listed in Table 5.

TABLE 4

| # | ferric p-toluene-sulfonate | polyethylene glycol* | urethane | methanol | Capacitance ($\mu$F) | | 100 kHz ESR (m$\Omega$) | LC ($\mu$A) |
|---|---|---|---|---|---|---|---|---|
| 1 | 50 | — | — | 50 | Average | 180.14 | 10.59 | 9.57 |
|   |    |   |   |    | Std. | 1.77 | 0.55 | 4.30 |
| 2 | 50 | 10 | — | 40 | Average | 210.03 | 9.51 | 6.78 |
|   |    |    |   |    | Std. | 2.21 | 0.38 | 5.45 |
| 3 | 50 | — | 7.82 | 42.18 | Average | 175.81 | 10.57 | 35.73 |
|   |    |   |      |       | Std. | 4.15 | 0.65 | 26.33 |
| 4 | 50 | 10 | 7.82 | 32.18 | Average | 230.37 | 8.70 | 1.91 |
|   |    |    |      |       | Std. | 1.60 | 0.40 | 0.91 |

*The molecular weight of polyethylene glycol is 1000.

TABLE 5

| # | Composition of oxidant solution (wt %) | | | | Solid electrolytic capacitor properties | | | |
| --- | --- | --- | --- | --- | --- | --- | --- | --- |
| | ferric p-toluene-sulfonate | polyethylene glycol* | succinimide | methanol | Capacitance (μF) | | 100 kHz ESR (mΩ) | LC (μA) |
| 1 | 50 | — | — | 50 | Average | 180.14 | 10.59 | 9.57 |
| | | | | | Std. | 1.77 | 0.55 | 4.30 |
| 2 | 50 | 10 | — | 40 | Average | 210.03 | 9.51 | 6.78 |
| | | | | | Std. | 2.21 | 0.38 | 5.45 |
| 3 | 50 | — | 8.70 | 41.30 | Average | 163.77 | 9.06 | 14.89 |
| | | | | | Std. | 2.21 | 0.35 | 4.17 |
| 4 | 50 | 10 | 8.70 | 31.30 | Average | 232.68 | 9.01 | 2.64 |
| | | | | | Std. | 3.82 | 0.23 | 2.18 |

*The molecular weight of polyethylene glycol is 1000.

The effect of polyethylene glycol and succinimide to the solid electrolytic capacitor is shown in the solid electrolytic capacitor properties listed in Table 5. It is found that the static capacitance of the solid electrolytic capacitor is increased from 180 μF to 210 μF by addition of polyethylene glycol to the oxidant solution. It is also found that the static capacitance is slightly reduced to 164 μF by addition of only succinimide to the oxidant solution; that is, succinimide alone in the oxidant solution does not improve the static capacitance of the solid electrolytic capacitor. However, when both polyethylene glycol and succinimide are present in the oxidant solution, the static capacitance of the solid electrolytic capacitor is increased up to 233 μF, that is, the co-existence of polyethylene glycol and succinimide has a synergistic effect on improvement of the static capacitance of the solid electrolytic capacitor. The results show that the co-existence of polyethylene glycol and succinimide can achieve an unexpected effect, and therefore the static capacitance of the solid electrolytic capacitor can be affectively enhanced.

Example 6

A solid electrolytic capacitor element fabricated according to the manner of Example 1 was dipped in a monomer solution of 3,4-ethylenedioxythiophene (EDOT) and an oxidant solution listed in Table 6, followed by polymerization, sealing and charge aging with reference to the conditions of Example 1, so as to form a solid electrolytic capacitor of Example 6. The properties such as static capacitance, 100 kHz equivalent series resistance (ESR), leakage current (LC) of each solid electrolytic capacitor of Example 6 were measured and listed in Table 6.

The effect of polyethylene glycol and N-methyl acetamide to the solid electrolytic capacitor is shown in the solid electrolytic capacitor properties listed in Table 6. It is found that the static capacitance of the solid electrolytic capacitor is increased from 180 μF to 210 μF by addition of polyethylene glycol to the oxidant solution. It is also found that the static capacitance is slightly reduced to 158 μF by addition of only N-methyl acetamide to the oxidant solution; that is, N-methyl acetamide alone in the oxidant solution does not improve the static capacitance of the solid electrolytic capacitor. However, when both polyethylene glycol and N-methyl acetamide are present in the oxidant solution, the static capacitance of the solid electrolytic capacitor is increased up to 233 μF; that is, the co-existence of polyethylene glycol and N-methyl acetamide has a synergistic effect on improvement of the static capacitance of the solid electrolytic capacitor. The results show that the co-existence of polyethylene glycol and N-methyl acetamide can achieve an unexpected effect, and therefore the static capacitance of the solid electrolytic capacitor can be affectively enhanced.

Example 7

A solid electrolytic capacitor element fabricated according to the manner of Example 1 was dipped in a monomer solution of 3,4-ethylenedioxythiophene (EDOT) and an oxidant solution listed in Table 7, followed by polymerization, sealing and charge aging with reference to the conditions of Example 1, so as to form a solid electrolytic capacitor of Example 7. The properties such as static capacitance, 100 kHz equivalent series resistance (ESR), leakage current (LC) of each solid electrolytic capacitor of Example 7 were measured and listed in Table 7.

TABLE 6

| # | Composition of oxidant solution (wt %) | | | | Solid electrolytic capacitor properties | | | |
| --- | --- | --- | --- | --- | --- | --- | --- | --- |
| | ferric p-toluene-sulfonate | polyethylene glycol* | N-methyl acetamide | methanol | Capacitance (μF) | | 100 kHz ESR (mΩ) | LC (μA) |
| 1 | 50 | — | — | 50 | Average | 180.14 | 10.59 | 9.57 |
| | | | | | Std. | 1.77 | 0.55 | 4.30 |
| 2 | 50 | 10 | — | 40 | Average | 210.03 | 9.51 | 6.78 |
| | | | | | Std. | 2.21 | 0.38 | 5.45 |
| 3 | 50 | — | 3.21 | 46.79 | Average | 158.24 | 9.55 | 12.68 |
| | | | | | Std. | 1.79 | 0.47 | 8.43 |
| 4 | 50 | 10 | 3.21 | 36.79 | Average | 233.06 | 8.88 | 3.42 |
| | | | | | Std. | 2.76 | 0.36 | 1.47 |

*The molecular weight of polyethylene glycol is 1000.

TABLE 7

| # | Composition of oxidant solution (wt %) | | | | Solid electrolytic capacitor properties | | | |
|---|---|---|---|---|---|---|---|---|
| | ferric p-toluene-sulfonate | polypropylene glycol* | imidazole | methanol | | Capacitance (μF) | 100 kHz ESR (mΩ) | LC (μA) |
| 1 | 50 | — | — | 50 | Average | 180.14 | 10.59 | 9.57 |
| | | | | | Std. | 1.77 | 0.55 | 4.30 |
| 2 | 50 | 10 | — | 40 | Average | 185.63 | 8.68 | 17.67 |
| | | | | | Std. | 3.05 | 0.40 | 18.68 |
| 3 | 50 | — | 2.99 | 47.01 | Average | 168.15 | 10.52 | 5.13 |
| | | | | | Std. | 2.67 | 0.30 | 2.82 |
| 4 | 50 | 10 | 2.99 | 37.01 | Average | 218.42 | 8.75 | 38.68 |
| | | | | | Std. | 2.92 | 0.30 | 35.84 |

*The molecular weight of polypropylene glycol is 1000.

The effect of polypropylene glycol and imidazole to the solid electrolytic capacitor is shown in the solid electrolytic capacitor properties listed in Table 7. It is found that the static capacitance of the solid electrolytic capacitor is increased from 180 μF to 185 μF by addition of polypropylene glycol to the oxidant solution. It is also found that the static capacitance is slightly reduced to 168 μF by addition of only imidazole to the oxidant solution; that is, imidazole alone in the oxidant solution does not improve the static capacitance of the solid electrolytic capacitor. However, when both polypropylene glycol and imidazole are present in the oxidant solution, the static capacitance of the solid electrolytic capacitor is increased up to 218 μF; that is, the co-existence of polypropylene glycol and imidazole has a synergistic effect on improvement of the static capacitance of the solid electrolytic capacitor. The results show that the co-existence of polypropylene glycol and imidazole can achieve an unexpected effect, and therefore the static capacitance of the solid electrolytic capacitor can be affectively enhanced.

Example 8

Jeffamine® D230 (represented by formula I below) as a diamine compound available from Huntsman Corporation and succinic acid were mixed in a molar ratio of 5:4, and reacted completely under nitrogen at 160° C. Excessive acetic acid was added thereto, and the resulting solution was refluxed and reacted at the same temperature until the reaction was completed. The generated water and the remaining acetic acid were removed by heating under reduced pressure. Therefore, a polyether-amide copolymer having a molecular weight of 1500 (polyoxypropylene-amide in Table 8 represented by formula II below) was obtained. The copolymer was added to the oxidant solution according to the amount ratio of Table 8.

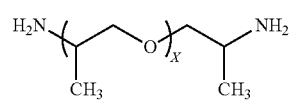

Formula I $X = \sim 2.5$, MW = 230

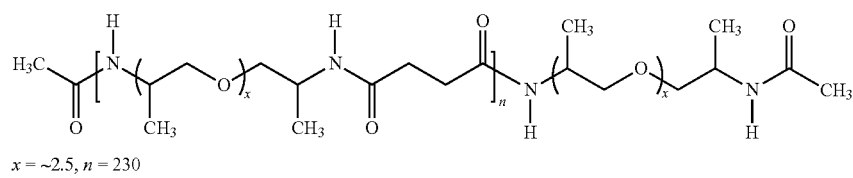

Formula II $x = \sim 2.5, n = 230$

A solid electrolytic capacitor element fabricated according to the manner of Example 1 was dipped in a monomer solution of 3,4-ethylenedioxythiophene (EDOT) and an oxidant solution listed in Table 8, followed by polymerization, sealing and charge aging with reference to the conditions of Example 1, so as to form a solid electrolytic capacitor of Example 8. The properties such as static capacitance, 100 kHz equivalent series resistance (ESR), leakage current (LC) of each solid electrolytic capacitor of Example 8 were measured and listed in Table 8.

TABLE 8

| # | Composition of oxidant solution (wt %) | | | | | Solid electrolytic capacitor properties | | | |
|---|---|---|---|---|---|---|---|---|---|
| | ferric p-toluene-sulfonate | poly propylene glycol* | N-methyl acetamide | polyoxy-propylene amide | methanol | | Capacitance (μF) | 100 kHz ESR (mΩ) | LC (μA) |
| 1 | 50 | | | — | 50 | Average | 180.14 | 10.59 | 9.57 |
| | | | | | | Std. | 1.77 | 0.55 | 4.30 |

TABLE 8-continued

| | Composition of oxidant solution (wt %) | | | | | Solid electrolytic capacitor properties | | |
| | ferric p-toluene- | poly propylene | N-methyl | polyoxy- propylene | | Capacitance | 100 kHz ESR | LC |
| # | sulfonate | glycol* | acetamide | amide | methanol | (μF) | (mΩ) | (μA) |
| --- | --- | --- | --- | --- | --- | --- | --- | --- |
| 2 | 50 | 10 | — | — | 40 | Average 185.63 | 8.68 | 17.67 |
| | | | | | | Std. 3.05 | 0.40 | 18.68 |
| 3 | 50 | 10 | 7.5 | — | 32.5 | Average 224.63 | 10.19 | 3.71 |
| | | | | | | Std. 2.65 | 0.28 | 1.72 |
| 4 | 50 | — | — | 17.5 | 32.5 | Average 224.91 | 9.58 | 2.72 |
| | | | | | | Std. 5.55 | 0.37 | 1.09 |

*The molecular weight of polypropylene glycol is 1000.

The effect of polypropylene glycol and polyoxypropylene-amide copolymer to the solid electrolytic capacitor is shown in the solid electrolytic capacitor properties listed in Table 8. It is found that the static capacitance of the solid electrolytic capacitor is increased from 180 μF to 185 μF by addition of polypropylene glycol to the oxidant solution. However, when both polypropylene glycol and N-methyl acetamide are present in the oxidant solution, the static capacitance of the solid electrolytic capacitor is greatly enhanced from 180 μF to 224 μF. It is also found that when polyoxypropylene-amide is used instead of polypropylene glycol and N-methyl acetamide, the static capacitance of the solid electrolytic capacitor is still maintained at 224 μF. The results show that the addition of polyoxypropylene-amide or addition of both polypropylene glycol and N-methyl acetamide has the same effect on improvement of the static capacitance of the solid electrolytic capacitor.

In view of the results, a polymer formed from a polyether and a nitrogen-compound can function as polypropylene glycol and N-methyl acetamide mixed each other in the oxidant solution, both of which can achieve an unexpected effect, and therefore the static capacitance of the solid electrolytic capacitor can be affectively enhanced.

Example 9

A solid electrolytic capacitor element fabricated according to the manner of Example 1 was dipped in a monomer solution of 3,4-ethylenedioxythiophene (EDOT) and an oxidant solution listed in Table 9, followed by polymerization, sealing and charge aging with reference to the conditions of Example 1, so as to form a solid electrolytic capacitor of Example 9. The properties such as static capacitance, 100 kHz equivalent series resistance (ESR), leakage current (LC) of each solid electrolytic capacitor of Example 9 were measured and listed in Table 9.

The effect of polyethylene glycol and imidazole to the solid electrolytic capacitor is shown in the solid electrolytic capacitor properties listed in Table 9. It is found that the static capacitance of the solid electrolytic capacitor is increased from 187 μF to 211 μF by addition of polyethylene glycol to the oxidant solution. It is also found that the static capacitance is slightly reduced to 174 μF by addition of only imidazole to the oxidant solution; that is, imidazole alone in the oxidant solution does not improve the static capacitance of the solid electrolytic capacitor. However, when both polyethylene glycol and imidazole are present in the oxidant solution, the static capacitance of the solid electrolytic capacitor is increased up to 236 μF. The results show that the co-existence of polyethylene glycol and imidazole can achieve an unexpected effect, and therefore the static capacitance of the solid electrolytic capacitor can be affectively enhanced. Besides, by comparison with Example 1, it is proved that the synergistic effect of the co-existence of polyethylene glycol and imidazole on improvement of the static capacitance of the solid electrolytic capacitor works in different solvent systems.

Example 10

A solid electrolytic capacitor element fabricated according to the manner of Example 1 was dipped in a monomer solution of 3,4-ethylenedioxythiophene (EDOT) and an oxidant solution listed in Table 10, followed by polymerization, sealing and charge aging with reference to the conditions of Example 1, so as to form a solid electrolytic capacitor of Example 10. The properties such as static capacitance, 100 kHz equivalent series resistance (ESR), leakage current (LC) of each solid electrolytic capacitor of Example 10 were measured and listed in Table 10.

TABLE 9

| | Composition of oxidant solution (wt %) | | | | Solid electrolytic capacitor properties | | |
| | ferric p-toluene- | polyethylene | | | | 100 kHz ESR | LC |
| # | sulfonate | glycol* | imidazole | 1-butanol | Capacitance (μF) | (mΩ) | (μA) |
| --- | --- | --- | --- | --- | --- | --- | --- |
| 1 | 40 | — | — | 60 | Average 187.91 | 12.64 | 20.67 |
| | | | | | Std. 2.70 | 0.49 | 14.70 |
| 2 | 40 | 10 | — | 50 | Average 211.86 | 10.16 | 5.05 |
| | | | | | Std. 2.79 | 0.41 | 4.26 |
| 3 | 40 | — | 2.39 | 57.61 | Average 174.35 | 14.80 | 10.98 |
| | | | | | Std. 2.77 | 0.49 | 6.09 |
| 4 | 40 | 10 | 2.39 | 47.61 | Average 236.29 | 11.84 | 2.33 |
| | | | | | Std. 4.69 | 0.55 | 1.58 |

*The molecular weight of polyethylene glycol is 1000.

TABLE 10

| | Composition of oxidant solution (wt %) | | | | Solid electrolytic capacitor properties | | |
|---|---|---|---|---|---|---|---|
| # | copper p-toluene-sulfonate | polyethylene glycol* | imidazole | methanol | Capacitance (µF) | 100 kHz ESR (mΩ) | LC (µA) |
| 1 | 50 | — | — | 50 | Average 10.12<br>Std. 3.62 | 276.85<br>172.79 | 0.93<br>0.20 |
| 2 | 50 | 10 | — | 40 | Average 5.21<br>Std. 1.99 | 81.30<br>32.00 | 4.93<br>0.42 |
| 3 | 50 | — | 4.20 | 45.80 | Average 13.28<br>Std. 1.17 | 63.84<br>7.36 | 1.64<br>0.69 |
| 4 | 50 | 10 | 4.20 | 35.80 | Average 93.25<br>Std. 5.99 | 1.15<br>0.12 | 2.03<br>0.29 |

*The molecular weight of polyethylene glycol is 1000.

When the oxidant solution includes copper p-toluene-sulfonate, the effect of polyethylene glycol and imidazole to the solid electrolytic capacitor is shown in the solid electrolytic capacitor properties listed in Table 10. It is found that the static capacitance of the solid electrolytic capacitor is decreased from 10.12 µF to 5.21 µF by addition of polyethylene glycol to the oxidant solution. It is also found that the static capacitance is slightly increased to 13.28 µF by addition of only imidazole to the oxidant solution. However, when both polyethylene glycol and imidazole are present in the oxidant solution, the static capacitance of the solid electrolytic capacitor is increased up to 93.25 µF; that is, when the oxidant solution includes copper p-toluene-sulfonate, the co-existence of polyethylene glycol and imidazole has a synergistic effect on improvement of the static capacitance of the solid electrolytic capacitor. The results show that when the oxidant solution includes copper p-toluene-sulfonate, the co-existence of polyethylene glycol and imidazole can achieve an unexpected effect, and therefore the static capacitance of the solid electrolytic capacitor can be affectively enhanced.

In view of the foregoing, when a polyether and a nitrogen-containing compound or a nitrogen-containing polymer are present in the oxidant solution, or when a polyether with nitrogen-containing functional groups is present in the oxidant solution, each of which can achieve an unexpected effect, and therefore the static capacitance of the solid electrolytic capacitor can be affectively enhanced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A solid electrolytic capacitor, comprising an electrolyte mixture formed by polymerizing a precursor of a monomer of a conjugated polymer and an oxidant mixture directly on a surface of a dielectric layer,
wherein the oxidant mixture at least comprising an oxidant, a polyether, and a nitrogen-containing compound, or at least comprising the oxidant, the polyether, and a nitrogen-containing polymer, or at least comprising the oxidant, and a polyether with nitrogen-containing functional groups on a main chain thereof.

2. The solid electrolytic capacitor of claim 1, wherein the oxidant is selected from the group consisting of a ferric ion-containing salt, a copper ion-containing salt and persulfate.

3. The solid electrolytic capacitor of claim 2, wherein the ferric ion-containing salt is selected from the group consisting of ferric sulfate, ferric p-toluenesulfonate, ferric chloride, ferric nitriate, ferric perchlorate and combinations thereof.

4. The solid electrolytic capacitor of claim 2, wherein the persulfate is selected from the group consisting of sodium persulfate, ammonium persulfate and combinations thereof.

5. The solid electrolytic capacitor of claim 1, wherein the polyether is selected from the group consisting of polyethylene glycol, a polyethylene glycol copolymer, polyethylene oxide, a polyethylene oxide copolymer, polypropylene glycol, a polypropylene glycol copolymer, polyoxymethylene, a polyoxymethylene copolymer, polyphenylene oxide, a polyphenylene oxide copolymer and combinations thereof.

6. The solid electrolytic capacitor of claim 1, wherein the nitrogen-containing compound is selected from the group consisting of an imidazole compound, an imidazoline compound, an urethane compound, an imide compound, an amide compound, an urea compound, a pyridine compound, a malamine compound, a triazole compound and combinations thereof.

7. The solid electrolytic capacitor of claim 1, wherein the nitrogen-containing polymer is selected from the group consisting of polyacrylamide, polyvinyl pyrrolidone, polyvinyl pyridine, polyethyleneimine, polyamide, polyimide, a secondary amine-containing polymer, a tertiary amine-containing polymer, a quaternary amine-containing polymer and combinations thereof.

8. The solid electrolytic capacitor of claim 1, wherein the monomer of the conjugated polymer is selected from the group consisting of thiophene, a thiophene derivative, pyrrole, a pyrrole derivative, aniline, an aniline derivative and combinations thereof.

9. The solid electrolytic capacitor of claim 1, wherein the monomer of the conjugated polymer comprises 3,4-ethylenedioxythiophene.

* * * * *